United States Patent [19]

Dhingra

[11] 4,427,877

[45] Jan. 24, 1984

[54] PRINTING ON LOW SURFACE ENERGY POLYMERS

[75] Inventor: Vijay K. Dhingra, Foster City, Calif.

[73] Assignee: Raychem Corporation, Menlo Park, Calif.

[21] Appl. No.: 306,265

[22] Filed: Sep. 28, 1981

[51] Int. Cl.[3] .......................... H05B 3/10; H01C 7/10; B32B 27/00

[52] U.S. Cl. .................................... 219/548; 219/504; 219/505; 219/549; 338/22 R; 338/22 SD; 428/141; 428/149; 428/421; 428/409; 524/494; 524/545; 524/546

[58] Field of Search ............... 428/409, 422, 910, 325, 428/421, 141, 149; 264/210.6; 524/494, 545, 546; 338/22 R, 22 SD, 226, 256, 257, 262, 275; 219/504, 505, 548, 549

[56] References Cited

U.S. PATENT DOCUMENTS

| | | | |
|---|---|---|---|
| 2,888,367 | 5/1959 | Greyson | 428/288 |
| 3,684,755 | 8/1972 | Gumerman | 524/546 |
| 3,903,234 | 6/1971 | Ikeda et al. | 264/210.6 |
| 3,992,350 | 11/1976 | Bensa et al. | 524/546 |
| 4,096,227 | 6/1978 | Gore | 264/210.6 |
| 4,104,509 | 8/1978 | Van Bokestal et al. | 338/256 |
| 4,113,908 | 9/1978 | Shinomura | 428/330 |
| 4,176,148 | 11/1979 | Maydes et al. | 264/210.6 |
| 4,318,950 | 3/1982 | Takashi et al. | 428/409 |
| 4,334,148 | 6/1982 | Kampe | 338/22 R |
| 4,400,614 | 8/1983 | Sopory | 219/549 |

FOREIGN PATENT DOCUMENTS

| | | |
|---|---|---|
| WO80/00014 | 1/1980 | PCT Int'l Appl. . |
| 1090056 | 11/1967 | United Kingdom . |
| 1105119 | 3/1968 | United Kingdom . |
| 1360236 | 7/1974 | United Kingdom . |
| 1478474 | 6/1977 | United Kingdom . |
| 2012617 | 10/1977 | United Kingdom . |
| 1591582 | 6/1981 | United Kingdom . |

OTHER PUBLICATIONS

Brandup et al., (eds), "Polymer Handbook" (2nd ed.) John Wiley & Sons, New York, pp. III-221 to III-228.

U.K. Search Report.

E. I. Du Pont de Nemours & Co. Technical Report #136.

*Primary Examiner*—William R. Dixon, Jr.

*Attorney, Agent, or Firm*—Timothy H. P. Richardson

[57] ABSTRACT

Polymers having low surface energy, e.g. fluorocarbon polymers, are rendered printable by conventional methods, e.g. offset printing, by incorporating a suitable particulate filler in the polymer, and shaping the filled polymer under conditions which result in the surface of the shaped polymer having irregularities which correspond to the particles of the filler. Suitable fillers comprise particles having at least two dimensions in the range of 1 to 40 microns; glass fibers are particularly satisfactory. Extruded insulating polymeric jackets for electrical components, e.g. strip heaters and wire and cable, can readily be marked by use of the invention.

14 Claims, No Drawings

PRINTING ON LOW SURFACE ENERGY POLYMERS

FIELD OF THE INVENTION

This invention relates to printing on polymers having low surface energy.

INTRODUCTION TO THE INVENTION

It is well known that it is difficult to provide sharp, permanent markings on surfaces composed of polymers having low surface energies, especially perfluoropolymers such as copolymers of tetrafluoroethylene and perfluoropropylene. It has not hitherto been satisfactory to mark such surfaces with conventional printing inks, applied for example by offset printing. A number of marking processes have been used or proposed for use, but all are unsatisfactory; they include plasma treatment of the surface, laser printing and melt embossing.

SUMMARY OF THE INVENTION

It has now been discovered that such polymers can be rendered printable by incorporating therein a suitable particulate filler and shaping the filled polymer by a method which allows filler to remain at or near the surface of the shaped article, so that the article has surface irregularities which correspond to the filler particles.

In one aspect, the present invention provides an article having a surface portion which (a) is composed of an extruded composition comprising
  (i) an organic polymer component which has a surface energy of less than 27 dynes/cm and
  (ii) a particulate filler component comprising particles which have at least two dimensions in the range of 1 to 40 microns, with the third dimension preferably being at least 1 micron;
(b) has surface irregularities which correspond to said particles; and
(c) has firmly adherent markings thereon of a printing ink.

In another aspect the invention provides a method of making an article as defined above which comprises (1) forming a shaped article by extruding a composition which comprises:
  (i) an organic polymer component which has a surface energy of less than 27 dynes/cm, and
  (ii) a particulate filler component comprising particles which do not melt during the extrusion, which have at least two dimensions in the range of 1 to 40 microns and which cause the surface of the article to have irregularities which render the shaped article printable in step (2); and
(2) printing markings on the shaped article with a printing ink.

DETAILED DESCRIPTION OF THE INVENTION

The lower the surface energy of a polymer, the more difficult it is to print on. It seems possible, in the light of my discovery, that the incorporation of a suitable filler can result in an improvement in the printability of all polymers. However, there are many satisfactory methods of printing on relatively high surface energy polymers (e.g. polyethylene, surface energy about 31 dynes/cm), whether filled or not. Accordingly the present invention is restricted in polymers having surface energies of less than 27 dynes/cm, and is particularly useful for polymers having surface energies less than 24 dynes/cm, especially less than 22 dynes/cm, e.g. 17 to 21 dynes/cm, on which it is difficult or impossible to print by conventional means without use of this invention. (The surface energies referred to herein are of course measured on the organic polymer component itself, in the absence of the particulate filler.)

The organic polymer component may be a single polymer (as is generally preferred) or a mixture of polymers. When a mixture of polymers is used, preferably each of the polymers has a surface energy less than 27 dynes/cm, preferably less than 24 dynes/cm, especially less than 22 dynes/cm. The invention is particularly useful when the polymer is a fluorocarbon polymer, this term being used to include a polymer or mixture of polymers which contains moore than 25% by weight of fluorine, in particular the perfluorinated polymers. Fluorocarbon polymers often have melting points of at least 200° C. Preferably the organic polymer component is such that the filled polymer can be melt-extruded, but the invention also includes polymers like polytetrafluoroethylene which are formed into shaped articles by paste extrusion followed by sintering. The invention is particularly valuable when the polymer is a copolymer of tetrafluoroethylene and perfluoropropylene (e.g. one of the Teflon-FEP polymers available from du Pont) or a copolymer of tetrafluoroethylene and a perfluoroalkoxy monomer (e.g. Teflon-PFA also available from du Pont); these copolymers may contain small amounts (e.g. less than 5% by weight) of other monomers.

The particles of the particulate filler must be such that they will cause micro-roughening of the surface which is sufficient to make it printable. Accordingly the particles must have (on average) a size of at least 1 micron, preferably at least 2 micron, in at least two dimensions (i.e. in two of three mutually perpendicular directions), and preferably in each dimension. On the other hand, the roughening of the surface caused by the filler should preferably not be too great or the abrasion resistance of the surface will fall undesirably. Accordingly at least two of the dimensions should be in the range 1 to 40, preferably 2 to 30, microns, with these two dimensions preferably differing from each other by a factor of not more than 3. The third dimension appears to be less important; thus it can be in the range 1 to 40, preferably 2 to 30, microns or can be higher. The shape of the particles can be generally spherical, or generally rod-like, or, less desirably, generally plate-like.

Excellent results have been obtained using glass fibers having a diameter of 4 to 20 microns, preferably 7 to 15 microns. The average length of such fibers may, for example, initially be 15 to 60 microns (or more), which with typically become, after mixing and extrusion, 5 to 30 microns. Glass beads and calcined clay are further examples of suitable fillers.

The amount of particulate filler used should be sufficient to cause adequate roughening of the surface. Preferably the composition comprises 2 to 20%, particularly 4 to 17%, especially 7 to 15%, by volume of the particulate filler. For many fillers, a suitable amount is about 5 to 15% by weight.

After the filler has been mixed with organic polymer component, the mixture must be shaped by a method which results in the to-be-marked surface of the shaped article having micro-roughness which results from the presence of the particulate filler at or just below the surface and which enables the surface to be printed by conventional methods. The height of the irregularities of the surface may be for example from 10% to 80%, e.g. 20% to 50%, of the average minimum dimension of the particles of the filler. Extrusion of the composition, particularly melt-extrusion, is a suitable shaping method. Compression molding, on the other hand, is not satisfactory because it results in a polymer-rich surface which is essentially free of particulate filler and which does not have irregularities corresponding to the particles of the filler.

The invention is particularly useful for providing an electrically insulating outer jacket around an electrical component, the jacket having firmly adherent markings of printing ink thereon. The electrical component can be, for example, a simple metal wire, a mineral-insulated cable, or an electrical heater, especially a self-regulating heater comprising at least two electrodes which are electrically connected by an element composed of a conductive polymer composition which exhibits PTC behavior. The insulating jacket can be in direct contact with the conductive components or separated therefrom by another insulating layer. The invention is particularly useful for steam-cleanable heaters as disclosed in commonly assigned application Ser. Nos. 150,909, 150,910 and 150,911 by Sopory.

Printing of the filled jacket material can be effected in any of the conventional ways using a conventional printing ink. Reverse offset printing is the preferred method. In many cases it is preferred to use a printing ink which can be heat-set, and to carry out a heat-setting step, e.g a flame treatment, after the markings have been printed on the article. The sharpness of the markings is often improved if the surface is heat-treated, e.g. by passing it through a flame, just before the printing step.

EXAMPLES

The invention is illustrated by the following Examples. In each of the Examples, the ingredients and amounts thereof (in parts by weight) shown in the Table below were dried at 120° C. (250° F.) for 10–12 hours and were then mixed together in a 1½ inch extruder fitted with a three hole die. The extrudate was quenched in a cold water bath and chopped into pellets. The pellets were dried at 120° C. (250° F.) for 10–12 hours and were then fed to a 2½ inch extruder fitted with a cross-head die. The composition was melt-extruded as a tube having a wall thickness of about 500 mil, and the tube was immediately drawn down about 20× into close conformity with a pre-jacketed self-limiting strip heater as described in the Sopory applications referred to above. The jacketed heater was quenched in a water bath at about 18° C. After annealing at 175° C. for 4 hours (which has no effect on the FEP jacket), followed by cooling, the heater was marked by printing the FEP jacket with ink (Mathew-145) by the dry offset method. Just before and just after the printing step, the heater was passed through a flame.

TABLE

| EXAMPLE NO | 1* | 2* | 3 | 4 | 5* | 6 | 7 | 8 |
|---|---|---|---|---|---|---|---|---|
| FEP-100 | 90 | — | 35 | 25 | 90 | 90 | 90 | — |
| FEP-140 | — | 90 | — | — | — | — | — | 90 |
| FEP-9110 | 10 | 10 | 15 | — | — | — | — | — |
| LF-1004M | — | — | 50 | 75 | — | — | — | — |
| % by wt. glass fibers | — | — | 10 | 15 | — | — | — | — |
| Carbon Black, particle size 0.1 micron | — | — | — | — | 10 | — | — | — |
| Calcined Clay, particle size 2 micron | — | — | — | — | — | 10 | — | — |
| Glass Beads, particle size 40 microns | — | — | — | — | — | — | 10 | 10 |

Notes
*indicates comparative Example
FEP-100 and FEP-140 are copolymers of tetrafluoroethylene and perfluoropropylene available from E. I. duPont de Nemours. They have different molecular weights.
FEP 9110 is a red color concentrate which contains a small amount of a red colorant, with the balance being a copolymer of tetrafluoroethylene and perfluoropropylene. It is available from E. I. duPont de Nemours.
LF-1004M is a mixture of 20% by weight of milled glass fibers (diameter about 10 microns and length about 40 microns) and 80% by weight of FEP 100 or FEP 140. It is available from LNP Corp.

In Examples 1, 2 and 5, which are comparative Examples not in accordance with the invention, the printing rubbed off very easily. In the other Examples, the printing was sharp and could not be rubbed off by the kind of abrasion likely to be encountered in use of the product.

I claim:

1. An article having a surface portion which
(a) is composed of a void free melt-extruded composition comprising
(i) an organic polymer component which has a surface energy of less than 24 dynes/cm and
(ii) a particulate filler component comprising particles which have at least two dimensions in the range of 1 to 40 microns, the amount of the filler component being 2 to 20% by volume of the composition;
(b) has surface irregularities which are created by said particles; and
(c) has firmly adherent markings thereon of a printing ink.

2. An article according to claim 1 which is an electrical component having an electrically insulating outer jacket composed of said extruded composition.

3. An article according to claim 1 wherein the organic polymer component consists essentially of at least one organic polymer having a surface energy of 17 to 22 dynes/cm.

4. An article according to claim 1 wherein the organic polymer component consists essentially of at least one fluorocarbon polymer.

5. An article according to claim 4 wherein the organic polymer component consists essentially of at least one perfluorocarbon polymer.

6. An article according to claim 5 wherein the organic polymer component consists essentially of a copolymer of tetrafluoroethylene and perfluoropropylene.

7. An article according to claim 5 wherein the organic polymer component consists essentially of a copolymer of tetrafluoroethylene and a perfluoroalkoxy trifluoroethylene.

8. An article according to claim 1 wherein the particulate filler consists essentially of particles having at least two dimensions in the range of 2 to 30 microns, with the third dimension being at least 2 microns.

9. An article according to claim 8 wherein said composition contains 4 to 17% by volume of the filler.

10. An article according to claim 9 wherein said composition contains 7 to 15% by volume of the filler.

11. An article according to claim 8 wherein the particulate filler consists essentially of glass fibers having a diameter of 4 to 20 microns.

12. An article according to claim 11 wherein the glass fibers have a diameter of 7 to 15 microns and an average length of 5 to 30 microns.

13. An article according to claim 11 wherein the extruded composition contains 5 to 15% by weight of said glass fibers.

14. An article according to claim 1 which is in the form of an electrically insulating jacket around a self-regulating heater comprising at least two electrodes which are electrically connected by an element composed of a conductive polymer composition which exhibits PTC behavior.

* * * * *